US005493457A

United States Patent [19]
Kawamura et al.

[11] Patent Number: 5,493,457
[45] Date of Patent: Feb. 20, 1996

[54] OPTICAL DISK APPARATUS WITH COOLING ARRANGEMENT

[75] Inventors: Ichirou Kawamura, Osaka; Ryoichi Imanaka, Hirakata, both of Japan

[73] Assignee: Matsushita Electric Industrial Co., Ltd., Osaka, Japan

[21] Appl. No.: 243,090

[22] Filed: May 16, 1994

Related U.S. Application Data

[63] Continuation of Ser. No. 962,630, Oct. 19, 1992.

[30] Foreign Application Priority Data

Oct. 18, 1991  [JP]  Japan ..................... 3-270817

[51] Int. Cl.⁶ .......................... G11B 33/14; H05K 7/20
[52] U.S. Cl. .................. 369/75.1; 360/97.02; 369/77.1; 361/690
[58] Field of Search .................. 369/75.1, 75.2, 369/77.1, 77.2, 292; 360/97.01–97.04; 361/383–384, 690, 694, 695; 364/708

[56] References Cited

U.S. PATENT DOCUMENTS

| 4,500,944 | 2/1985 | Roberts et al. | 361/384 |
|---|---|---|---|
| 4,628,992 | 12/1986 | Kennedy | 361/384 |
| 4,771,412 | 9/1988 | Aihara et al. | 369/75.1 |
| 4,797,782 | 1/1989 | Wistling | 361/384 |
| 5,057,951 | 10/1991 | Eckerd | 360/97.02 |
| 5,086,422 | 2/1992 | Hagiya et al. | 360/97.02 |
| 5,121,291 | 6/1992 | Cope et al. | 361/383 |
| 5,163,870 | 11/1992 | Cooper | 361/384 |
| 5,168,424 | 12/1992 | Bolton et al. | 361/384 |
| 5,255,137 | 10/1993 | Suzuki | 360/97.02 |
| 5,255,254 | 10/1993 | Watanabe et al. | 369/75.1 |
| 5,255,256 | 10/1993 | Engler et al. | 360/97.02 |
| 5,301,178 | 4/1994 | Okabe et al. | 369/77.1 |

FOREIGN PATENT DOCUMENTS

| 0173989 | 7/1991 | Japan | 369/292 |
|---|---|---|---|
| 3154282 | 7/1991 | Japan | 369/75.1 |
| 4021989 | 1/1992 | Japan | 369/292 |
| 4038785 | 2/1992 | Japan | 369/292 |
| 0490186 | 3/1992 | Japan | 360/97.02 |
| 0490188 | 3/1992 | Japan | 369/75.1 |
| 4206087 | 7/1992 | Japan | 369/292 |
| 4212770 | 8/1992 | Japan | 369/292 |

*Primary Examiner*—Robert S. Tupper
*Assistant Examiner*—Brian E. Miller
*Attorney, Agent, or Firm*—Wenderoth, Lind & Ponack

[57] ABSTRACT

An optical disk apparatus includes an optical disk drive including an optical disk and an optical head, a power source for supplying electric power to the optical disk drive an apparatus casing for enclosing at least the optical disk drive and the power source, and a first air feed member having a first air passage. The first air feed member includes a first air inlet for introducing cooling air into the apparatus casing from outside of the apparatus casing so as to cool the optical disk drive, and an air filter disposed upstream of the optical disk drive in the first air passage such that the cooling air flows into the optical disk drive through the air filter. A second air feed member has a second air passage and included a second air inlet for introducing cooling air into the apparatus casing from outside of the apparatus casing so as to cool at least the power source. A partition member is provided for separating the first and second air passages from each other. The flow rate of the cooling air in the first air passage is set to such a value as to maintain the optical disk drive at a predetermined temperature or less such that the optical disk drive is not polluted with airborne dust.

8 Claims, 4 Drawing Sheets

5,493,457

OPTICAL DISK APPARATUS WITH COOLING ARRANGEMENT

This application is a Continuation of now abandoned application Ser. No. 07/962,630, filed on Oct. 19, 1992.

BACKGROUND OF THE INVENTION

The present invention relates to an apparatus for recording and reproducing information signals by using an optical disk or the like. When the optical disk drive is used by incorporating the optical disk drive in a personal computer, etc., a subsystem apparatus for the personal computer or a computer is optimized structurally and the optical disk drive itself is improved structurally. Thus, when the improved optical disk drive is incorporated in an optical disk apparatus such as the subsystem apparatus, the personal computer, etc. and is operated in an environment of polluted air, the optical disk drive is operated stably.

In recent years, performance of personal computers has been improved remarkably and the personal computers have been used quite generally. A subsystem apparatus employing an optical disk drive for a magnetic disk or an optical disk acting as an auxiliary storage of the personal computers is also quite frequently used in improper environments such as air having much dust or high and low temperatures in general offices, factories, etc. in addition to proper environments for conventional large computers.

Conventionally, the optical disk drive is used either as the subsystem apparatus in which the optical disk drive is accommodated together with a power source in a casing or by incorporating the optical disk drive into the personal computer.

FIG. 1 shows a known subsystem apparatus. In FIG. 1, the known subsystem apparatus includes an optical disk drive 20, an apparatus casing 21 having an air inlet 25 and an air outlet 26, a power source 22 for supplying electric power to the optical disk drive 20, an air filter 23 and a ventilating fan 24. The optical disk drive 20 and the power source 22 are accommodated in the apparatus casing 21. It is to be noted that an aperture of the optical disk drive 20 acts also as the air outlet 26. Air is introduced from the air inlet 25 into the apparatus casing 21 as shown by the arrow 25a and is then fed through the ventilating fan 24 from the air filter 23 so as to be discharged from the air outlet 26 as shown by the arrow 26a such that the optical disk drive 20 and the power source 22 are cooled by the air.

In the known subsystem apparatus, since both the power source 22 having a large heat release value and the optical disk drive 20 are cooled by air having passed through the single air filter 23, flow rate of air is required to be increased. Therefore, if the known subsystem apparatus is used in environments of air having much dust, clogging of the air filter 23 readily takes place in a short period of time, so that proper heat dissipation cannot be achieved due to a drop in the amount of air flow through the air filter 23.

Meanwhile, another optical disk apparatus including an apparatus casing in which the air filter is not provided at the air inlet was proposed in, for example, U.S. Pat. No. 5,086,422. In this prior art optical disk apparatus, air flows introduced from outside into the apparatus casing are arranged so as to not collide with each other such that dust does is less likely to adhere to an optical head.

However, in the prior art optical disk apparatus, since the air filter is not provided as described above, dust adheres to the optical head in a short period of time.

SUMMARY OF THE INVENTION

Accordingly, an essential object of the present invention is to provide an optical disk apparatus in which the amount of time before an air filter becomes clogged with dust is increased such that an optical disk drive can be operated stably for a long time.

Another important object of the present invention is to provide an optical disk apparatus in which air for cooling an optical head unit is not passed through an air filter but the optical head unit can be operated stably for a long time without airborne dust adhering thereto.

In order to accomplish the first object of the present invention, an optical disk apparatus according to the present invention comprises: an optical disk drive including an optical disk and an optical head; a power source for supplying electric power to the optical disk drive; an apparatus casing for enclosing at least the optical disk drive and the power source; a first air feed means having a first air passage and including a first air inlet for introducing cooling air into the apparatus casing from outside of the apparatus casing so as to cool the optical disk drive and an air filter disposed upstream of the optical disk drive in the first air passage such that the cooling air flows into the optical disk drive through the air filter; a second air feed means having a second air passage and including a second air inlet for introducing cooling air into the apparatus casing from outside of the apparatus casing so as to cool at least the power source; and a partition member for separating the first and second air passages from each other; wherein the flow rate of the cooling air in the first air passage is set to such a value as to maintain the optical disk drive at a predetermined temperature or less such that the optical disk drive is not polluted with airborne dust.

In the optical disk apparatus of the above described arrangement, air flow passing through the air filter is reduced greatly as compared with a prior art optical disk apparatus in which both the power source and the optical disk drive are cooled by air passing through a single air filter. As a result, the amount of time prior to clogging of the air filter can be lengthened and thus, the optical disk drive can be operated for a long time.

Namely, in the present invention, a minimum required quantity of the cooling air is introduced into the optical disk drive through the air filter so as to restrain a rise in temperature of an optical head incorporated in the optical disk drive. As a result, stable operation of the optical disk drive can be ensured. It is to be noted that it is necessary to restrict rise of temperature of the optical head is required to be because optical output of a laser diode used in the optical head drops at high temperatures. Meanwhile, the rise in temperature of a magnetooptical disk used as a recording medium must also required to be restrained because sensitivity characteristics of the magnetooptical disk vary with temperature. In addition, if dust adheres to the optical head including the laser diode, transmittance of a laser beam in an optical system decreases. As a result, power of the laser beam irradiated to a recording film of the optical disk drops, so that the optical disk cannot perform as designed, thus resulting in deterioration of the functions of the optical disk.

Therefore, in the present invention, only a portion which requires cooling and deteriorates in performances due to adherence of dust thereto is cooled by air which has passed through the air filter and the remaining portion is cooled by air which does not pass through the air filter. Accordingly, since air flow passing through the air filter is minimized, clogging of the air filter with dust can be prevented for a longer time.

In order to accomplish the second object of the present invention, an optical disk apparatus according to the present invention comprises: an optical disk drive including an optical head unit, a closed casing for accommodating the optical head unit and a member which is electrically connected to the optical head unit and requires heat dissipation; the member being provided outside the closed casing; the optical head unit including an optical disk, a disk motor for driving the optical disk, an optical head for recording and reproducing signals on the optical disk and a disk cartridge for enclosing the optical disk; a power source for supplying electric power to the optical disk drive; an apparatus casing for enclosing at least the optical disk drive and the power source; and an air feed means including an air inlet for introducing cooling air into the apparatus casing from outside of the apparatus casing so as to cool an interior of the apparatus casing, and an air discharge member for discharging the cooling air from the apparatus casing; the air feed means having an air passage disposed outside the closed casing such that the closed casing shields the optical head unit from the cooling air.

In the optical disk apparatus of the above described arrangement, since the closed casing physically separates the optical head unit from the member, air in the air passage running outside the closed casing does not enter the closed casing and is thus prevented from coming into contact with the optical head unit including the optical head and the optical disk. Therefore, since an air filter is not employed but air is prevented from entering the closed casing, so that air-borne dust in air does not adhere to the optical head unit, the optical head unit can be operated stably for a long time.

It is needless to say that a rise in temperature of the optical head unit should be avoided. When the optical head unit is enclosed in the boxlike closed casing and the cooling air is guided along an outer surface of the closed casing, it is possible to restrain rise of temperature of the optical head unit.

BRIEF DESCRIPTION OF THE DRAWINGS

These objects and features of the present invention will become apparent from the following description of the preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
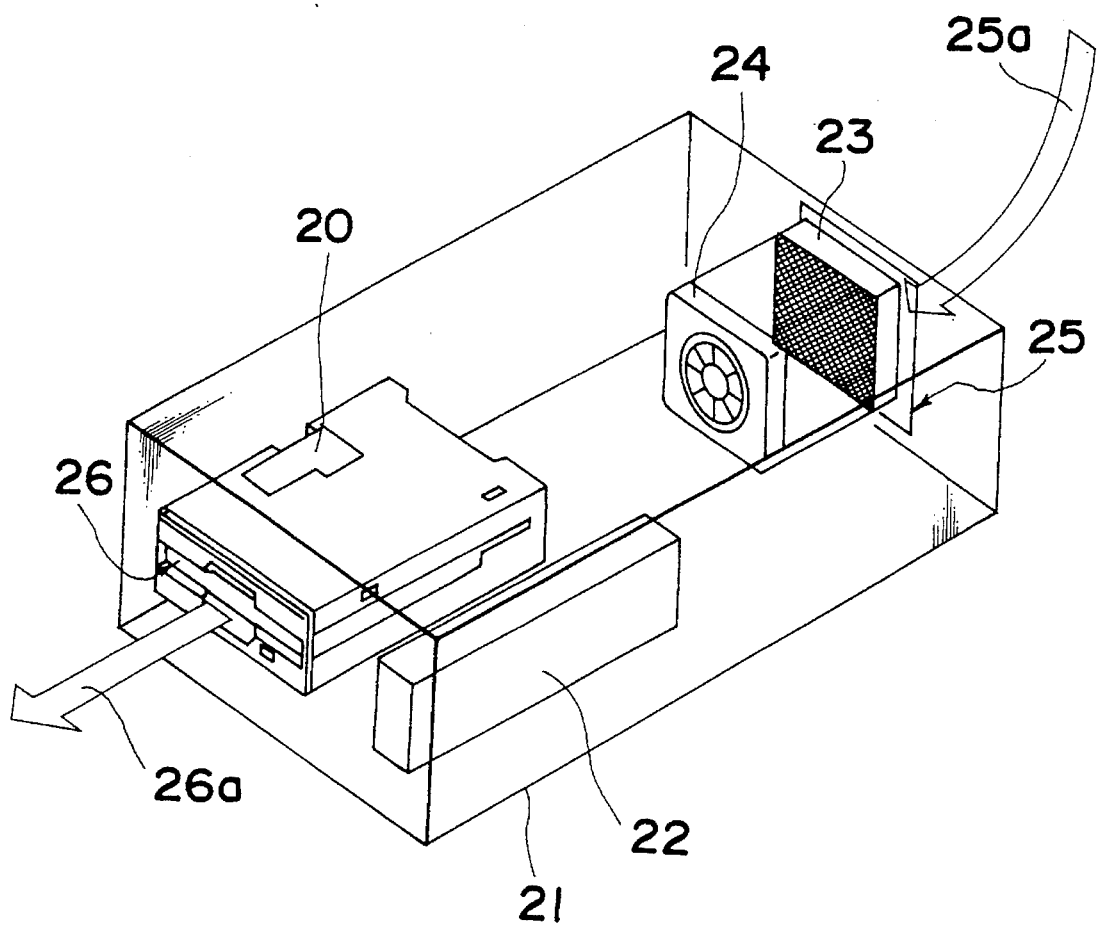
FIG. 1 is a schematic view showing construction of a prior art optical disk apparatus.
Figure 2:
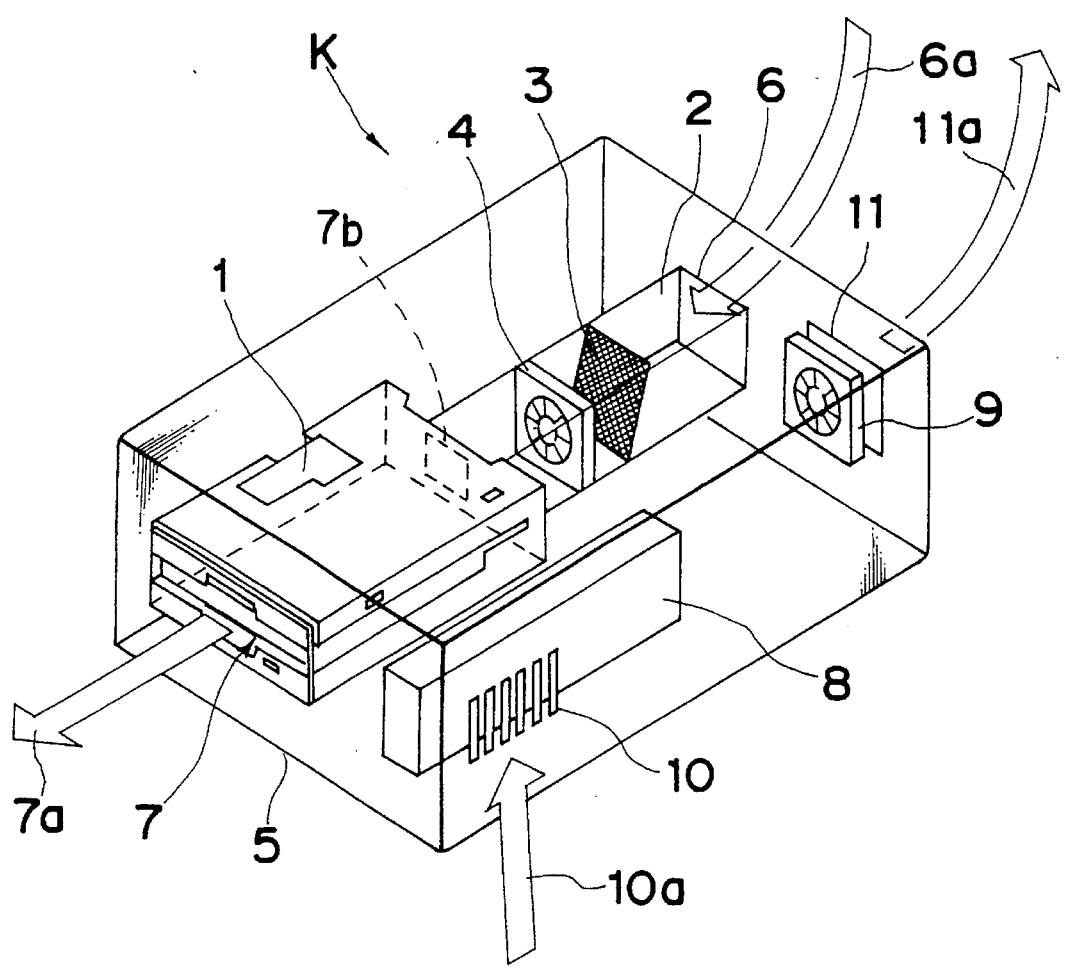
FIG. 2 is a perspective view showing construction of a subsystem apparatus according to one embodiment of the present invention.

Referring now to the drawings, there is shown in FIG. 2, an optical disk apparatus or a subsystem apparatus K according to a first embodiment of the present invention. The subsystem apparatus K includes an optical disk drive 1, a power source 8 for supplying electric power to the optical disk drive 1 and a casing 5 in which the optical disk drive 1 and the power source 8 are integrally accommodated. A wire connecting the power source 8 and the optical disk drive 1 is not illustrated. The subsystem apparatus K further includes a duct 2 for introducing air into the casing 5 as shown by the arrow 6a from an air inlet 6 provided at a rear portion of the casing 5, an air filter 3 provided in the duct 2 and a ventilating fan 4 provided downstream of the air filter 3 in the duct 2. Air having passed through the air filter 3 is drawn into the optical disk drive 1 (such as through an air inlet 7b as schematically illustrated in FIG. 2) by the ventilating fan 4 so as to be discharged from an air outlet (disk-insertion opening) 7 of the casing 1 as shown by the arrow 7a. The duct 2 extends from the air inlet 6 to the optical disk drive 1. It is to be noted that an aperture of the optical disk drive 1 acts also as the air outlet 7.

Generally, the power source 8 releases a larger quantity of heat than the optical disk drive 1. Air for cooling the power source 8 is introduced into the casing 5 from an air inlet 10 of the casing 5 as shown by the arrow 10a by a ventilating fan 9 so as to be discharged from an air outlet 11 of the casing 5 as shown by the arrow 11a.

Thus, a first air passage is produced by the ventilating fan 4 so as to extend from the air inlet 6 to the air outlet 7, while a second air passage is produced by the ventilating fan 9 so as to extend from the air inlet 10 to the air outlet 11. Since the duct 2 extends from the air inlet 6 to the optical disk drive 1 as described above, the first air passage is separated from the second air passage by the duct 2.

Meanwhile, the air passing through the air filter 3 is of sufficient quantity for restraining a rise in temperature of the optical disk drive 1 and is therefore set to a minimum value permissible in the most severe service environment by suitably selecting the ventilating fan 4 and the air filter 3 and designing the duct 2 and the air outlet 7.

By the above described arrangement of the subsystem apparatus K, since only air from which dust has been removed by the air filter 3 is supplied to the optical disk drive 1, it becomes possible to substantially prevent adherence of dust to an optical disk acting as a recording medium and an optical head for recording and reproducing information signals on the optical disk, which are provided in the optical disk drive 1.

Furthermore, the quantity of air passing through the air filter 3 is sufficient for cooling the optical disk drive 1 as described above. Therefore, the quantity of air passing through the air filter 3 is less than that of a prior art subsystem apparatus in which air for cooling both an optical disk drive and a power source is passed through an air filter. Thus, the degree of clogging of the air filter 3 by air passing therethrough is reduced accordingly. As a result, the time period prior to clogging of the air filter 3 is increased, so that the air filter 3 can be used for a long time, thereby reducing the maintenance of burden. Consequently, in an ordinary office environment, replacement of the air filter 3 can also be made unnecessary.

Meanwhile, in the subsystem apparatus K, static pressure is generated in the optical disk drive 1 by air flow fed into the optical disk drive 1 by the ventilating fan 4 so as to prevent entry into the optical disk drive 1 of air which has not passed through the air filter 4. Therefore, dust contained in a large quantity of cooling air sucked into the casing 5 from the air inlet 10 by the ventilating fan 9 is prevented from adhering to the optical disk, the optical head, etc. in the optical disk drive 1.

Furthermore, since an outer wall of the optical disk drive 1 is cooled by air flow caused by the ventilating fan 9, the flow rate of air fed to the optical disk drive 1 can be further reduced.

As is clear from the foregoing, in the optical disk apparatus of the present invention, the air flow passed through the air filter is supplied to only the optical disk drive, while another heat dissipation means is provided for the power source. Therefore, since dust is prevented from adhering to the recording medium and the optical head provided in the optical head drive, the optical head drive can be operated for a long time.

Furthermore, since the quantity of air for cooling the optical disk drive can be restricted to a minimum value for cooling the optical disk drive, the time period prior to clogging of the air filter can be lengthened such that the maintenance burden such as for replacement of the air filter, etc. can be alleviated.

Moreover, since the first air passage for cooling the optical disk drive and the second air passage for cooling the power source are separated from each other by the partition means, air pressure in the optical disk drive and that in the subsystem apparatus can be controlled. Thus, air which has not passed through the air filter can be prevented from entering the optical disk drive by static pressure in the optical disk drive. In addition, since the outer wall of the optical disk drive is cooled by air flow for cooling the power source, the flow rate of air introduced into the optical disk drive can be remarkably reduced in comparison with those of prior art subsystem apparatuses.

Figure 3:
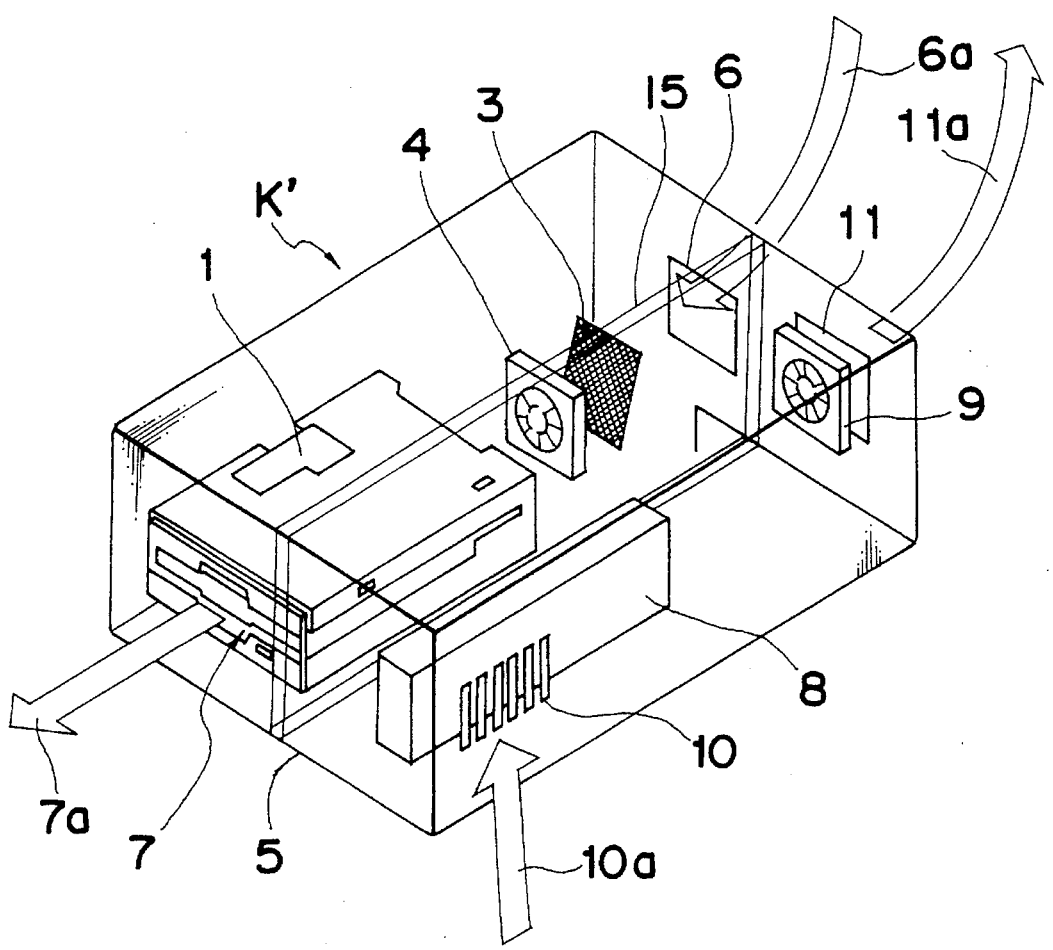
FIG. 3 is a view similar to FIG. 2, but showing a modification thereof.

FIG. 3 shows a subsystem apparatus K' which is a modification of the subsystem apparatus K. In the modified subsystem apparatus K', the duct 2 of the subsystem apparatus K is replaced by a partition wall 15. Thus, the first air passage of the ventilating fan 4 is separated from the second air passage of the ventilating fan 9 by the partition wall 15. Since the construction of the modified subsystem apparatus K' is otherwise similar to that of the subsystem apparatus K, further description thereof is omitted for the sake of brevity.

Figure 4:
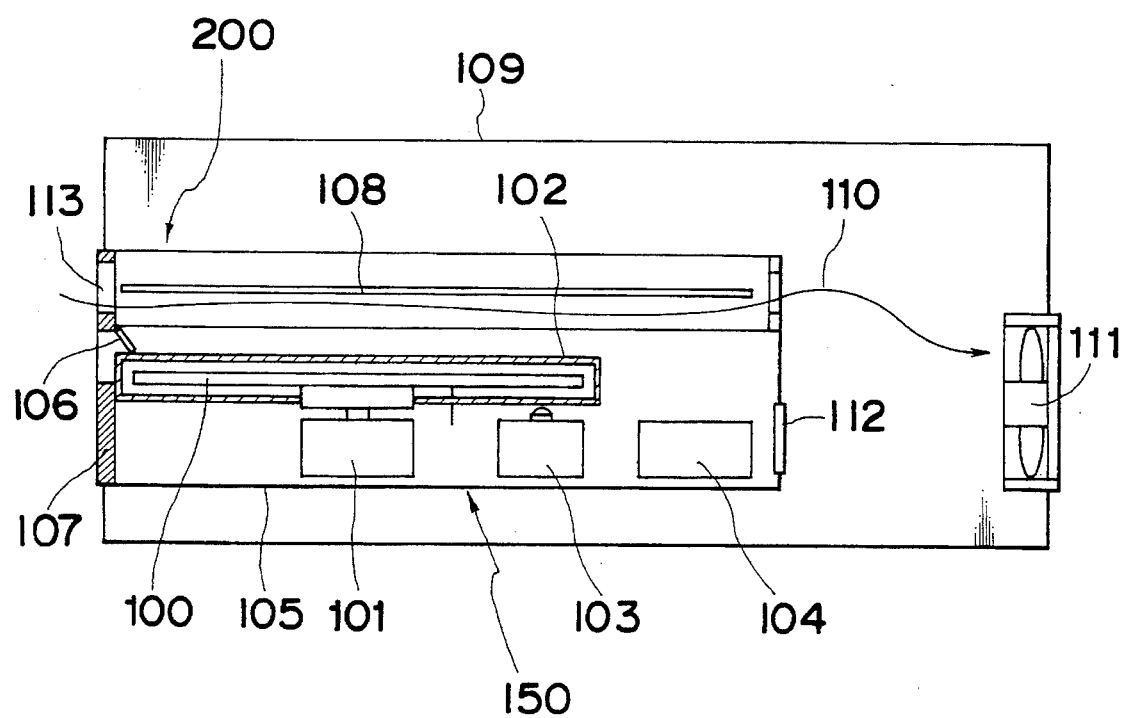
FIG. 4 is a sectional view of a subsystem apparatus incorporating an optical disk drive according to another embodiment of the present invention.

FIG. 4 shows a subsystem apparatus including a casing 109 in which an optical disk drive 200 according to another embodiment of the present invention is incorporated. The optical disk drive 200 includes an optical head unit 150 and a printed circuit board (which can be generally referred to as an electrical member) 108 which is electrically connected to the optical head unit 150 and requires heat dissipation. The optical head unit 150 includes a closed boxlike unit casing 105 in which an optical disk 100 enclosed in a cartridge 102, a disk motor 101 for controlling rotation of the optical disk 100, a movable portion 103 of an optical head and a fixed portion 104 of the optical head are accommodated so as to be shielded from outside air. The printed circuit board 108 is provided for controlling operation of the optical head unit 150 so as to record and reproduce information signals on the optical disk 100.

The movable portion 103 of the optical head includes an objective lens, a tracking and focusing actuator and a prism and is arranged to be moved in a radial direction of the optical disk 100. A laser beam emitted as a parallel light ray from the fixed portion 104 of the optical head is received by the objective lens so as to be focused on the optical disk 100 so as to record and reproduce information signals on the optical disk 100. The fixed portion 104 of the optical head is constituted by a laser diode, a photodetector and an optical member. An air filter 112 is provided on the unit casing 105 as necessary.

The optical disk drive 200 has a front bezel 107 in which a disk-insertion aperture, having a shutter 106 therein, and an air inlet 113 are integrally provided. The optical disk 100 enclosed in the cartridge 102 is loaded into the unit casing 105 by opening the shutter 106. A ventilating fan 111 is mounted on the casing 109. Air introduced into the casing 109 from the air inlet 113 cools the printed circuit board 108 as shown by the arrow 110 so as to be discharged out of the casing 109 by the ventilating fan 111. At this time, since the interior of the unit casing 105 is shielded from outside air by the shutter 106, no substantial entry of outside air into the unit casing 105 takes place. Therefore, adherence of airborne dust on the optical disk 100 and the movable portion 103 and the fixed portion 104 of the optical head is considerably reduced.

Meanwhile, when the disk motor 101 is rotated, air flow directed from an inner peripheral portion of the optical disk 100 towards an outer peripheral portion of the optical disk 100 is generated. As a result, a pressure difference is produced between the inside and the outside of the unit casing 105. Since this pressure difference may allow undesirable air flow to carry dust into the unit casing 105, the air filter 112 is provided on the unit casing 105 so as to cancel the pressure difference.

In this embodiment, the air filter 112 is provided at a rear portion of the unit casing 105. However, the air filter 112 may also be provided on the front bezel 107 or at another location of the unit casing 105.

Furthermore, in order to prevent a rise in temperature of the optical head unit 150, it is quite effective to employ an arrangement in which an air flow for cooling the optical head unit 150 is supplied to an outer surface of the unit casing 105. It is needless to say that the same effect as described above can be achieved by the arrangement of the subsystem apparatus of FIG. 4 in which air is introduced into the casing 109 by the ventilating fan 111.

Actually, the optical disk drive 200 is required to be provided with cables or connectors for electrically connecting the optical head unit 150 to an electronic circuit for controlling the optical head unit 150, such as the printed circuit board 108. Thus, slits for inserting the connecting cables are formed on the unit casing 105. Provision of such slits on the unit casing 105 will allow entry of air into the unit casing 105 and therefore, is not preferable in this respect. However, the quantity of air entering the unit casing 105 is sufficiently small as compared with that of an arrangement in which the unit casing 105 is not provided, such that the amount of dust adhering to the optical head does not cause problems in practical use. Therefore, the unit casing 105 should not be necessarily of an integral boxlike configuration but may be formed by platelike partition walls.

In the optical disk drive 200, the optical head unit 150 is enclosed by the unit casing 105 such that the optical disk 100 and the optical head are shielded from cooling air. Therefore, even if air for cooling the optical disk drive 200 is not passed through an air filter, deterioration in performance of the optical disk drive 200 due to dust can be lessened.

Meanwhile, it is needless to say that the optical disk drive 200 can be incorporated in the subsystem apparatus K of FIG. 2 or the subsystem apparatus K' of FIG. 3.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An optical disk apparatus comprising:

an apparatus casing;

an optical disk drive unit including an optical head, said optical disc drive unit being mounted in said apparatus casing;

a power source operably coupled to said optical disk drive unit, said power source being mounted in said apparatus casing and disposed outside said optical disk drive unit;

a partition member separating said apparatus casing into a first air passage portion and a second air passage portion, said first air passage portion being substantially fluidically isolated by said partition member from said second air passage portion, said power source being disposed in said second air passage portion and outside said first air passage portion;

a first air inlet formed in said apparatus casing and in communication with said first air passage portion for introducing cooling air into said first air passage portion to cool said optical disk drive unit;

an air filter disposed in said first air passage portion for filtering all cooling air introduced into said first air passage portion;

a first ventilation fan, disposed in said first air passage portion, for blowing the cooling air introduced into said first air passage portion by said first air inlet into said optical disk drive unit to thereby generate static pressure in said optical disk drive unit;

an air outlet formed in said apparatus casing in communication with said first air passage portion, said first ventilation fan being operable to blow the cooling air introduced into said first air passage portion by said first air inlet through said optical disk drive unit and out through said air outlet;

a second air inlet formed in said apparatus casing and in communication with said second air passage portion for introducing cooling air into said second air passage portion to cool said power source;

an additional air outlet formed in said apparatus casing in communication with said second air passage portion; and wherein said air filter and said partition member are arranged such that said partition member constitutes a means for allowing only air which has passed through said filter to flow into said optical disk drive unit;

whereby all cooling air introduced through said first air inlet is filtered and is substantially isolated from cooling air introduced through said second air inlet.

2. An optical disk apparatus as recited in claim 1, wherein said partition member comprises an enclosed duct.

3. An optical disk apparatus as recited in claim 1, wherein said partition member comprises a partition wall spanning between top and bottom walls of said apparatus casing.

4. An optical disk apparatus as recited in claim 1, further comprising a ventilation fan mounted at said additional air outlet.

5. An optical disk apparatus as recited in claim 1, wherein said optical disk drive unit has an aperture formed therein; and said aperture constitutes an air outlet of said first air passage portion, such that the cooling air blown into said optical disk drive unit by said first ventilation fan exists said first air passage portion through said aperture.

6. An optical disk apparatus comprising:

an apparatus casing having a front end and a rear end;

an optical disk drive unit including an optical head, said optical disc drive unit having a disk-insertion opening at a front end thereof and a cooling air inlet at a rear end thereof, said disk drive unit being mounted in said apparatus casing such that said disk-insertion opening is accessible through said front end of said apparatus casing;

a power source operably coupled to said optical disk drive unit, said power source being mounted in said apparatus casing and disposed outside said optical disk drive unit;

a first cooling air inlet formed in said apparatus casing;

a duct mounted in said apparatus casing and extending between said first cooling air inlet and said cooling air inlet of said optical disk drive unit;

a first ventilation fan mounted in said duct for drawing cooling air into said duct via said first cooling air inlet, and for blowing cooling air into said cooling air inlet of said optical disk drive unit and out of said optical disk drive unit through said disk-insertion opening of said optical disk drive unit;

a cooling air filter mounted in said duct for filtering the cooling air drawn into said duct before the cooling air is blown into said air inlet of said optical disk drive unit;

a second cooling air inlet formed in said apparatus casing;

a cooling air outlet formed in said apparatus casing; a second ventilation fan mounted inside said apparatus casing and outside said duct; and wherein, internally of said apparatus casing, said second cooling air inlet and said cooling air outlet are fluidically isolated from and not in fluid communication with an interior of said duct.

7. An optical disk apparatus as recited in claim 6, wherein said first ventilation fan is mounted in said duct between said cooling air filter and said cooling air inlet of said optical disk drive unit, such that said first ventilation fan is operable to draw cooling air through said air filter.

8. An optical disk apparatus as recited in claim 6, wherein said duct constitutes a means for allowing only cooling air which has passed through said cooling air filter to enter into said cooling air inlet of said optical disk drive unit.

* * * * *